Joseph F. Lindeman
William Gerald Dobbs
INVENTORS

ATTORNEYS

Aug. 19, 1958      J. F. LINDEMAN ET AL      2,847,809
MACHINE FOR POSITIONING ARTICLES IN TRAYS
Filed April 28, 1955      5 Sheets-Sheet 3
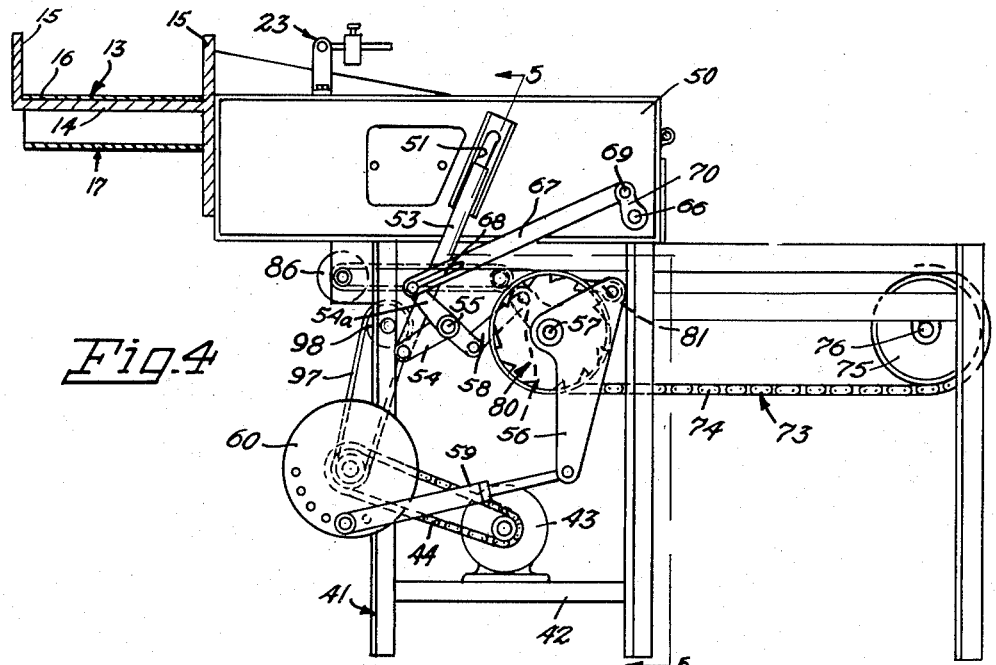
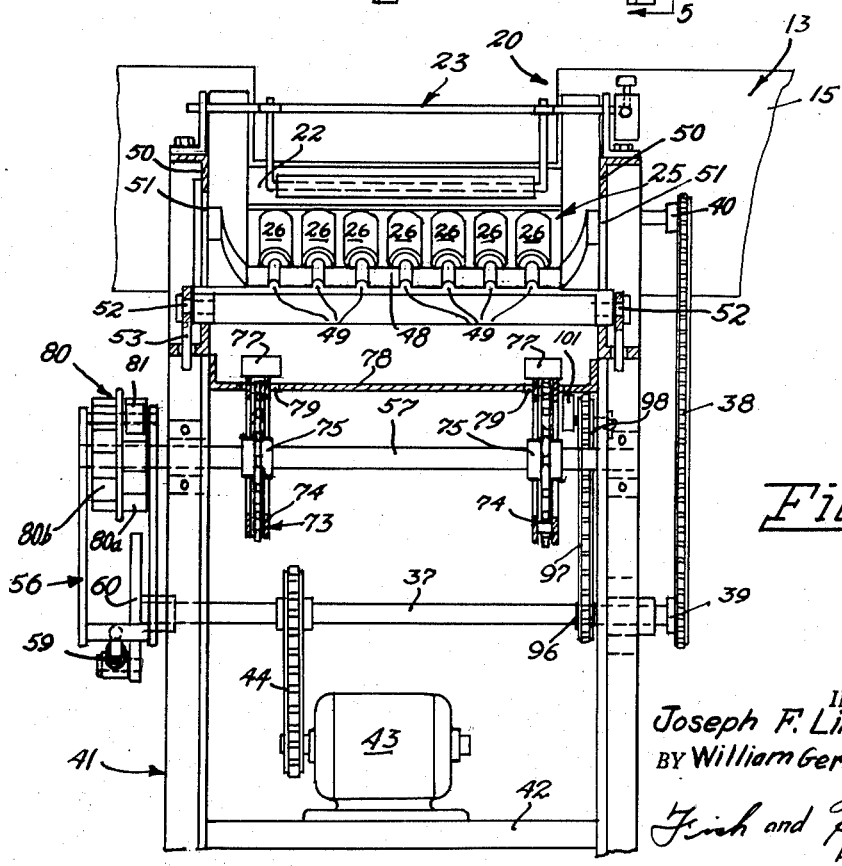
INVENTORS
Joseph F. Lindeman
BY William Gerald Dobbs
ATTORNEYS Aug. 19, 1958  J. F. LINDEMAN ET AL  2,847,809
MACHINE FOR POSITIONING ARTICLES IN TRAYS
Filed April 28, 1955  5 Sheets-Sheet 4
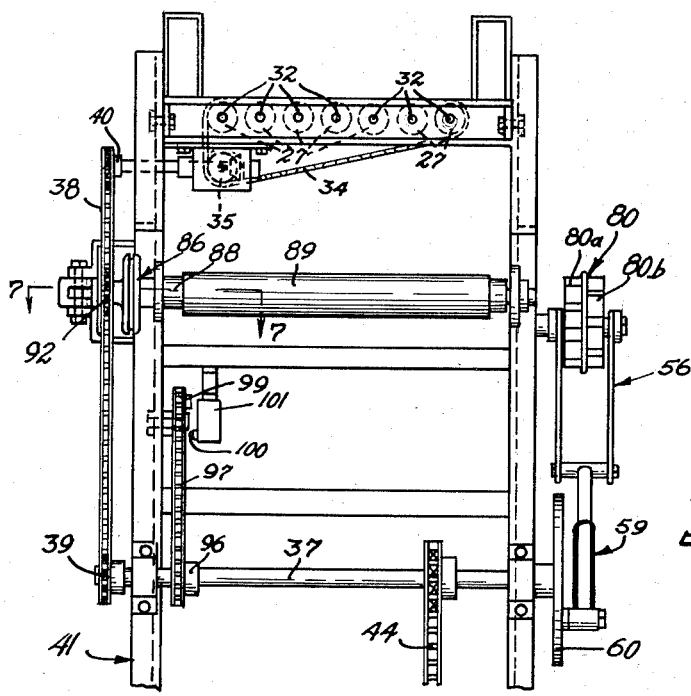
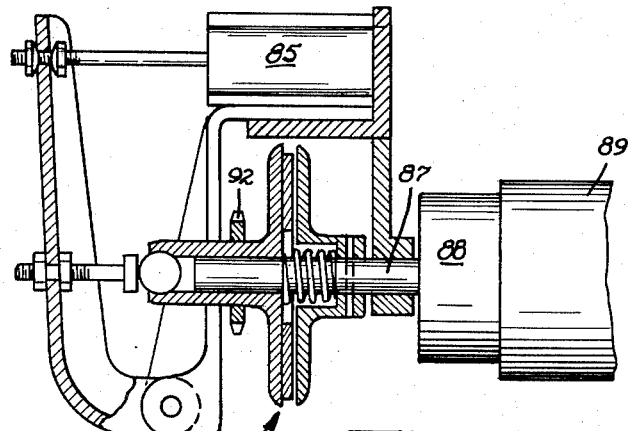
Joseph F. Lindeman
William Gerald Dobbs
INVENTORS
BY
ATTORNEYS Aug. 19, 1958
J. F. LINDEMAN ET AL
2,847,809
MACHINE FOR POSITIONING ARTICLES IN TRAYS
Filed April 28, 1955
5 Sheets-Sheet 5
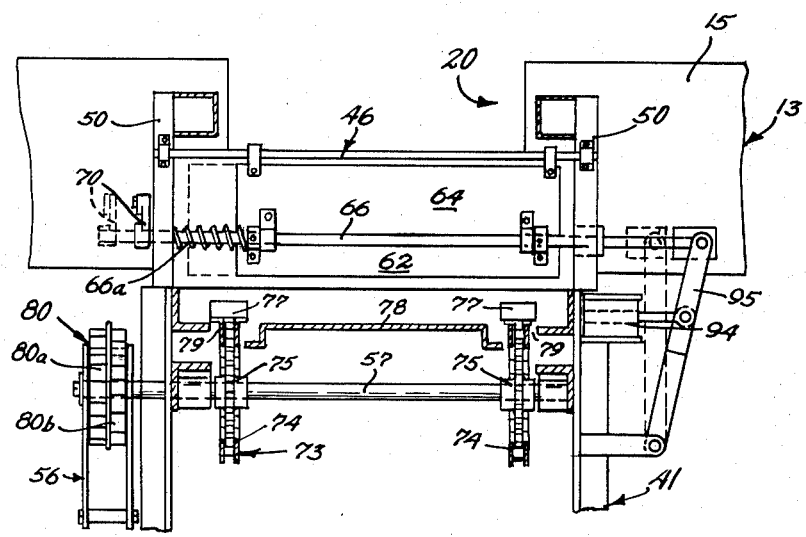
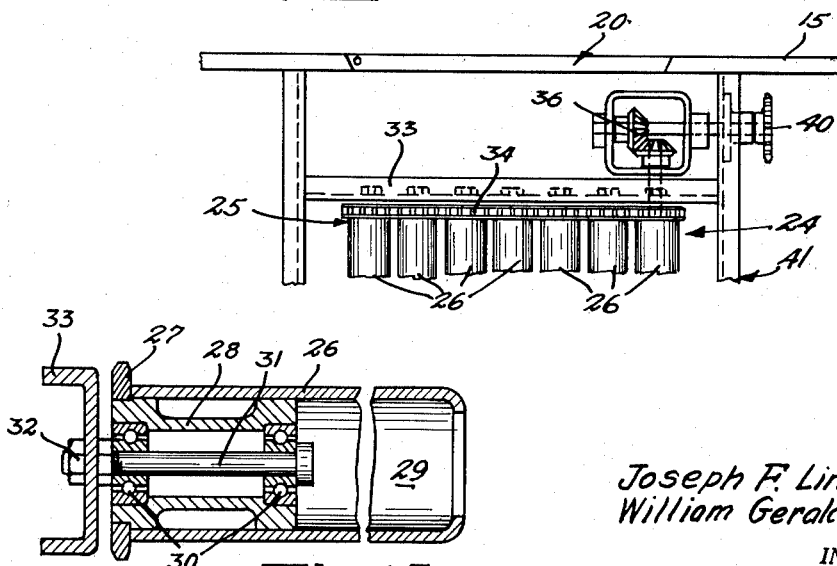
Joseph F. Lindeman
William Gerald Dobbs
INVENTORS
BY
ATTORNEYS under# United States Patent Office 2,847,809
Patented Aug. 19, 1958

2,847,809
MACHINE FOR POSITIONING ARTICLES IN TRAYS

Joseph F. Lindeman and William Gerald Dobbs, Yakima, Wash., assignors to Northwest Equipment Company, Inc., a corporation of Washington Application April 28, 1955, Serial No. 504,469

8 Claims. (Cl. 53—160)

This invention relates to article handling machinery, and more particularly to a device for placing articles in trays in a predetermined arrangement.

One object of the invention lies in the provision of a machine for putting articles in trays which may be included in a mechanical article handling system so that the articles may be arranged upon trays to be subsequently placed in a container.

Another object of the invention lies in the provision of a machine for putting articles in trays which is specifically designed to handle produce which is easily bruised, such as apples or peaches, and will, with a minimum amount of manipulation of the produce, deposit it gently in the trays.

Another object of the invention lies in the provision of a machine for packing articles in trays which is adapted to receive a plurality of articles in a jumbled condition and to arrange the articles in successive rows containing a predetermined number of individual articles, and subsequently to deposit the articles in a tray having receiving cups disposed in successive rows.

Another object of the invention lies in the provision of a machine for putting articles in trays and having an article-arranging means comprising a plurality of angularly disposed near spaced parallel rollers rotating in the same circumferential direction.

Another object of the invention lies in the provision of a machine for putting articles in trays which is adapted to arrange the articles in successive rows and in sequence to advance said apples to a releasing gate, and subsequently to deposit said apples in the cups of trays by means of said gate, and advancing said trays from row to row sequentially with the deposit of apples therein.

A further object of the invention lies in the provision of a machine as defined in the preceding paragraph and further characterized by the presence of an intermittently operated conveyor which is adapted to remove a filled tray subsequent to the placing of the final row of apples therein.

A still further object of the invention lies in the provision of a machine as defined in the paragraph next above, and further characterized by the inclusion of a tray advancing conveyor which is adapted to advance said trays in step by step movements in timed relation to the deposit of apples in said trays.

These previously disclosed objects and other important objects and advantages of the invention will become more apparent during a careful study of the following specification and drawings, wherein like numerals are employed to designate like parts.

We have disclosed in the drawings a preferred physical embodiment of the present invention. However, it should be understood that that drawings and specification are illustrative and are not intended to limit the scope of the invention beyond the limitations expressly defined in the appended claims.

In the accompanying drawings forming a part of this specification,

Figure 4 is a vertical side elevation showing the feed conveyor in cross section;

Figure 5 is a vertical transverse cross section taken on the planes indicated by lines 5—5 of Figure 4;

Figure 6 is a vertical elevation of the receiving end of the machine;

Figure 7 is a horizontal fragmentary cross section upon an enlarged scale taken on the plane indicated by the line 7—7 of Figure 6;

Figure 8 is a fragmentary vertical cross section taken transversely of the machine substantially on the plane indicated by line 8—8 of Figure 2 looking in the direction of the arrows;

Figure 9 is a fragmentary plan view as indicated by line 9—9 of Figure 3;

Figure 10 is a fragmentary longitudinal cross section taken through one of the rollers; and Figure 11 is a fragmentary side elevation showing the conveyor actuating switch and timing cam.

Although not limited thereto, the present invention is particularly adapted for placing produce such as peaches, citrus fruits, and in particular apples into trays. Since the machine has been successfully operated in a commercial packing house handling apples, it will be described as it relates to placing this fruit in trays but not for the purpose of limiting the use of the machine thereto.

Figure 1:
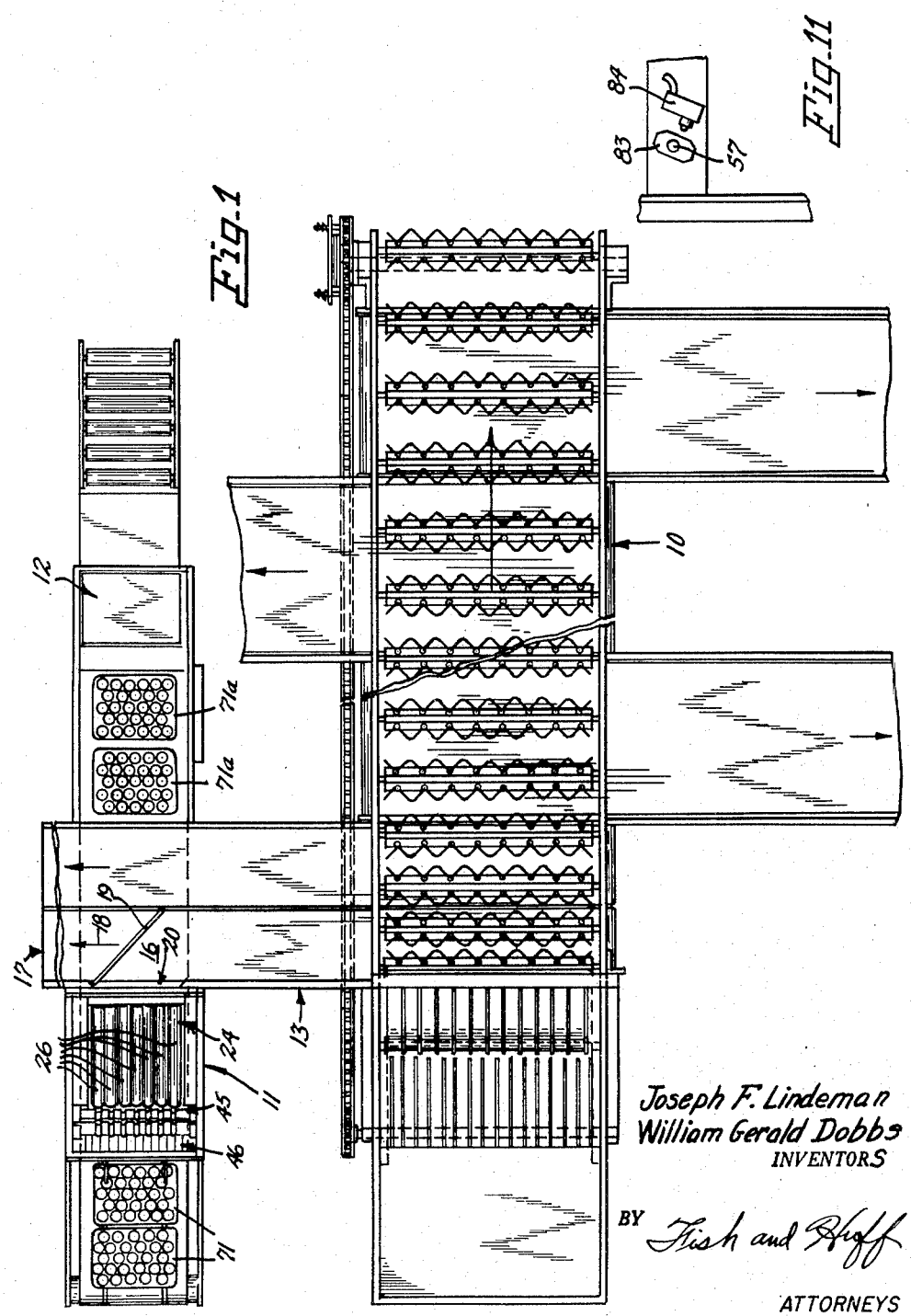
Figure 1 is a plan view of a produce handling system including the machine which constitutes the subject matter of the present invention.

Referring now with greater particularity to the drawings, we have shown in Figure 1 a system of handling apples or like articles which includes an article sizing machine 10, a tray filling machine 11, and a packaging machine 12 operably interconnected by suitable conveyors. The machine constituting the subject matter of the present invention is the tray filling machine 11, and it will be seen that means are provided for advancing apples to be put in the trays into the machine. This means is an endless belt or conveyor 13 which includes a frame 14 having upstanding confining walls 15 between which the upper flight 16 of the endless belt 17 travels in the direction of the arrow 18 (Figure 1).

A diagonally disposed guide 19 is positioned across the surface of the upper flight 17 and articles moving along the moving conveyor 16 are directed through a laterally disposed opening 20 formed in one wall 15.

As the apples 21 are advanced from the conveyor 13 through the opening 20, they pass down angled receiving plate 22 at the lower edge of which we provide a weighted flow control mechanism 23 which is adapted to control the level and flow of apples onto the means 24 for arranging the articles in successive rows. These means are seen to be a laterally horizontal bank 25 of rollers 26 which are disposed to receive apples 21 from the receiving plate 22, and are angled downwardly therefrom toward their discharge ends. At their upper ends, each roller 26 is provided with a concentric sprocket 27 which is rigidly fixed to a spool 28 over which the tubular housing 29 of the roller 26 is secured. Each spool is provided with spaced bearings 30 which journal the spool upon a stub shaft 31 anchored at 32 in a rigid cross member 33 of the machine frame. An endless chain 34 is trained about the several sprockets 27 in such a way as to drive all of the rollers 26 in the same circumferential direction as may be seen particularly in Figures 6 and 9. The chain 34 receives its power from a sprocket 35 which is driven through a conventional miter gear transmission 36 which in turn is operably associated with the main power shaft 37 by means of a chain 38 which is trained about the sprocket 39 on the power shaft 37 and a sprocket 40 of the miter transmission 36.

The frame 41 of the machine is provided with a shelf at 42 which carries the prime mover 43, here shown to be an electric motor, and a sprocket chain or other convenient power transmission mechanism 44 operably unites the motor 43 and the main power shaft 37 for continuous rotation thereof.

As the apples flow onto the rollers 26 and with the rollers rotating all in the same direction, the apples are caused to be spaced one from another in successive lateral rows in the channels defined between adjacent rollers. While being supported in the said channels, the apples continuously are rolled and are separated from each other and are prevented from sticking together.

At the lower or discharge end of the positioning means 24 we provide means 45 for advancing successive rows of apples to an article releasing mechanism 46. The advancing means comprises the laterally extending horizontal bar 47 which has a compartmented upper face 48, the compartments being defined by ridges 49 preferably of cushioning or resilient material.

The side plates 50 of the frame 41 are provided with upwardly extending angled slots 51 through which ends of the bar 48 extend. The ends of the bar 48 are pivotally secured by means of pivot pins 52 to push rods 53. The push rods 53 are pivotally secured at their lower ends to a bell crank 54 fixed on the end of a rock shaft 55 which is actuated by means of a rocking lever 56 journaled on a cross shaft 57 and operably connected by means of link 58 to the bell crank 54. At its opposed end the rock shaft 55 is provided with an actuating arm 54' so that the bar 48 will receive vertical shifting movement at both ends. The rocking lever 56 is operably connected by means of an adjustable connecting link 59 to a disc 60 serving as a crank arm and fixed on the end of the main power shaft 37. It will thus be seen that as the shaft 37 is rotated, the rocking lever 56 is caused to rock, imparting rocking movement to the rocking shaft 55 and in timed sequence causing the advancing bar 48 to reciprocate vertically.

The apples, when discharged from the ends of the arranging device 24, are deposited upon the advancing bar 48 and their forward movement is stopped by means of a stop plate 61 rigidly fixed between the side walls 50. The successive rows of apples are thus disposed in the position shown at 21a of Figure 3. As the rocking bar 48 is raised, the row of apples 21a is lifted over the stop plate 61 and by gravity advances to the article releasing mechanism 46.

The releasing mechanism comprises a gate 62 which is hingedly connected at 63 to a backboard 64 having cushioned spacing fingers 65, and as the rows of apples are advanced sequentially over the stop plate 61, they are received upon the gate 62. A laterally extending gate operating shaft 66 is journaled in the side walls 50 for both axial and circumferential movements and is operably connected to the gate 62 to shift the gate 62 from the retaining position seen in full lines of Figure 3, to the releasing position indicated by dotted lines of 63, wherein the apples are released to be deposited in a tray in the manner subsequently described.

The gate operating shaft 66 must be rocked in timed sequence to the vertical shifting of the advancing bar 48, and therefore the bell crank 54 on one side, as seen in Figure 4, is provided with an extension 54a which is operably connected to a connecting link 67 by means of the lost motion connection indicated at 68. The link is pivoted at 69 to the actuating arm 70 of the shaft 66.

Figure 2:
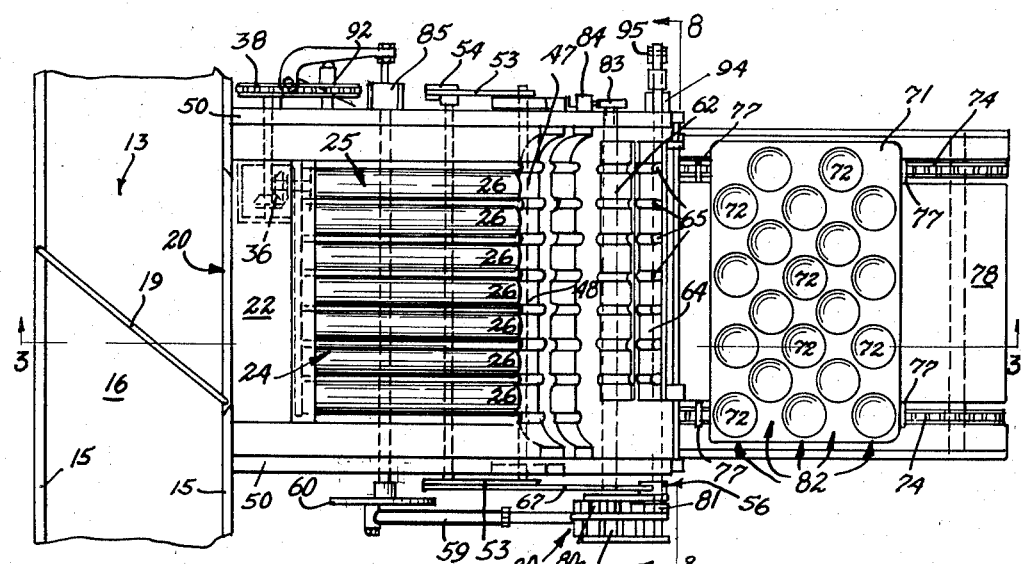
Figure 2 is a plan view of the tray filling machine.
Figure 3:
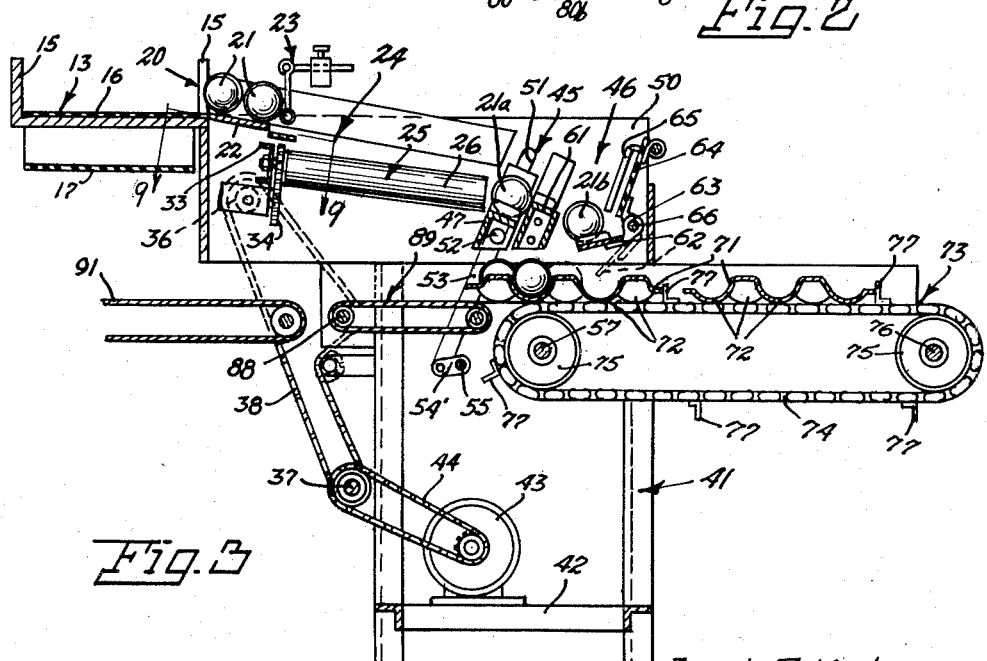
Figure 3 is a vertical longitudinal cross section taken on a plane indicated by line 3—3 of Figure 2.

As seen in Figure 2, the gate 62 is disposed in the releasing position, that is, when the advancing bar 48 is in its lowermost position the gate 62 is open to the dotted line position of Figure 3. As the bar 48 moves upwardly to advance a row of apples 21a to the releasing mechanism 46, the gate 62 closes and remains closed until the bar 48 reaches its lowermost position where it again opens.

From the foregoing description, it will be seen that apples or other articles may be arranged in successive rows; advanced in said rows to the article releasing mechanism 46 by means of the advancing mechanism 45; and released by the mechanism 46 to be deposited in trays 71. It is also to be noted that means are provided for operating said mechanisms in timed relationship to each other.

Since it is desired to deposit the apples 21b in trays 71 having a plurality of cups 72, we provide means for disposing trays relative to the releasing mechanism 46. Although it is obvious that the releasing mechanism may itself be moved and disposed in selected positions above stationary trays, we have found it more practical to advance the trays under the gate 62 for the purpose of receiving the apples 21b. Obviously, this action of advancing the trays must be accomplished in timed relation to the release of the apples 21b by the gate 62. Therefore we provide a chain conveyor 73 comprising a pair of laterally spaced longitudinally extending endless chains 74 which extend between and are trained about sprockets 75 fixed on the shaft 57, and a spaced shaft 76. The chains 74 are provided with coincident outwardly protruding ears 77 spaced along the length of each chain a sufficient distance to receive a tray 71 between successive ones thereof.

The frame 41 is provided with a table 78 upon which the trays 71 are supported, and the ears 77 of the chains 74 extend upwardly through the longitudinally extending slots 79 formed in the table 78, and thereby advance the trays 71 according to the movements of the chain 74.

On one outer end, the shaft 57 is provided with an escapement wheel 80 which in actual practice is seen to be two rigidly united wheels 80a and 80b. The rocking lever 56 is provided with a pawl or dog 81 which is manually shiftable from one ratchet wheel 80a to the other 80b according to selection. The selection will be made in accordance to the number of rows of cups 72 found present in the trays 71 being filled with apples for the time being.

It will be noted that the rocking lever 56 is journaled to rock about the shaft 57 while the dog 81 is disposed to engage in the teeth of the escapement wheel 80, and with the escapement wheel 80 rigidly fixed to the shaft 57, rocking movement of the lever 56 will impart successive movements to the chains 74 and, in so doing, the trays 71 will be advanced under the gate 62 to receive apples 21b therefrom. Obviously, the spacing between the teeth of the escapement wheel 80 is designed so that the trays 71 are advanced only a distance sufficient to dispose the successive rows 82 of cups 72 in their proper position to receive the apples 21b.

As seen in Figure 11, shaft 57 opposed to the escapement wheel 80 is provided with an actuating cam 83 which operates a normally open switch 84 to close the switch at regular intervals twice in each complete revolution of the shaft 57. It will also be noted that each complete revolution of the shaft 57 will advance two trays 71 under the gate 62. The switch 84 is operably connected in a powered circuit including the solenoid 85 which is adapted to actuate clutch 86 carried by a shaft 87 which is rigidly fixed to a roller 88 and journaled for rotation of said roller. A short conveyor belt 89 is trained about the roller 88 and a spaced roller 90, thus disposing the conveyor belt 89 to receive the trays 71a after they are filled with the apples 21b. Since it is not advisable to have the conveyor belt 89 operating continuously, the cam 83 is positioned on the shaft 57 in such a way as to energize the solenoid 85 at the time the last row of apples 21b is deposited in any one tray 71, whereupon the belt conveyor 89 immediately removes the filled tray 71a and deposits it upon the regular constantly operating conveyor 91.

In sequence upon completion of releasing the first row of apples 21b in the next succeeding tray 71, the cam advances to release the switch 84, thus stopping the conveyor belt 89 for a period in its operation.

It will be noted that the chain 38 is also trained about the sprocket 92 rigidly fixed to an element of the clutch 86, and thereby the clutch 86 is constantly driven from the main power shaft 37, but power is imparted to the roller 88 only when the solenoid 85 is actuated.

Escapement wheels 80a and 80b are separated by a disc 93 so that the dog 81 may not accidentally shift from one wheel to the other. When it is desired to employ a tray 71 having more or less rows of cups therein, the dog is shifted to the opposed escapement wheel which is specifically designed to accommodate the specific tray. Obviously other escapement wheels may be applied if found desirable.

Inspection of Figure 2 in particular will disclose that the cups in successive rows of the tray 71 are offset, and to accomplish proper placing of the apples by the gate 62 we have provided means for laterally shifting the releasing mechanism 46, and it will be seen in Figure 8 that this means comprises a solenoid 94 which is adapted to shift a pivoted arm 95 from the full line position of Figure 8 to the broken line position thereof, and in so doing shift the shaft 66 from the normal full line position thereof effected by the spring 66a to the dotted line position. It will thus be seen that since the releasing mechanism 46 is carried by the shaft 66, it also will shift laterally of the machine by action of the solenoid 94.

To accomplish the timed relationship shifting of the releasing mechanism 46, we provide a sprocket 96 fixed to the power shaft 37 and having a chain 97 trained about a disc 98 journaled on the frame and having a switch actuator strip 99 which is adapted to strike the actuating button 100 of the switch 101. The switch is operably connected to actuate the solenoid 94, and the ratio of the sprockets 96 and the disc 98 is such so as to effect lateral shifting one way or the other of the releasing mechanism 46 subsequent to each releasing movement of the gate 62. Thus the apples are accurately positioned over the cups 72 into which the apples are to be placed, and no manual handling thereof is required.

From the foregoing description it is obvious that since all of the mechanisms are operably associated for actuation for control from the rocking lever 56, they will operate in the sequence set forth to properly dispose arranged rows of apples in trays having predetermined rows of cups.

Having thus described our invention, we claim as new and desire to secure by Letters Patent of the United States the following:

1. In a machine for putting articles in trays having article receiving cups disposed in rows; the combination of means for advancing jumbled articles into the machine; a laterally horizontal bank of rollers angled downwardly from their article receiving ends to their discharge ends journaled on the machine and adapted to receive articles advanced into the machine; power means rotating said rollers all in the same circumferential direction whereby the articles are arranged in successive rows; an article releasing gate movable between an article retaining position and an article releasing position; means for advancing said successive rows of articles to said article releasing gate; means for advancing said trays relative to said gate to deposit the successive rows of articles released from said gate into successive rows of said cups; and means for operating said row advancing means, said gate, and said tray advancing means in timed relation to each other.

2. In a machine for putting articles in trays having article receiving cups disposed in rows with cups of successive rows offset from each other; the combination of means for advancing jumbled articles into the machine; a laterally horizontal bank of rollers disposed to receive articles so advanced and angled downwardly from their article receiving ends to their discharge ends journaled on the machine, power means for rotating said rollers in the same circumferential direction; whereby the articles are arranged in successive rows; an article releasing gate movable between an article retaining position and an aricle releasing position; means for advancing said successive rows of articles from said row arranging rollers to said article releasing gate comprising a vertically shiftable compartmented bar and stop plate adjacent to said bar, said bar being disposed to receive articles from said row arranging means, whereby when the bar is shifted upwardly the successive rows of articles are lifted over said stop plate; means for advancing said trays relative to said gate to deposite the successive rows of articles released from said gate into successive rows of said cups; and means for operating said row advancing means, said gate, and said tray advancing means in timed relation to each other.

3. In a machine of the class described, the combination of means for advancing jumbled articles to be put into trays into the machine; means for arranging the articles in successive rows; said arranging means comprising a laterally horizontal bank of rollers angled downwardly from said apple receiving ends to their discharge ends journaled on the machine, and power means constantially rotating said rollers in the same direction; an article releasing mechanism comprising a gate movable between an article retaining position and an article releasing position; means for advancing successive rows of said articles to said article releasing mechanism; and means for operating said advancing means and said gate sequentially in timed relation to each other.

4. In a machine of the class described, the combination of means for advancing jumbled articles to be put into trays into the machine; means for arranging the articles in successive rows with each article in each respective row spaced from the other articles in the same row; an article releasing mechanism comprising a gate movable between an article retaining position and an article releasing position; means for advancing successive rows of said articles to said article releasing mechanism; said advancing means comprising a vertically shiftable compartmented bar and a stop plate adjacent to said bar; said bar being disposed to receive apples from said row arranging means, whereby when the bar is shifted upwardly the successive rows of apples are lifted over said stop plate; and means for operating said advancing means and said gate sequentially in timed relation to each other.

5. In a machine for putting apples in trays having apple receiving cups disposed in rows with the cups of successive rows offset from each other, the combination of means for advancing jumbled apples into the machine; means for arranging the apples in successive rows; an apple releasing gate movable from an apple retaining position to an apple releasing position and having a gate operating shaft journaled on the machine for rectilinear and circumferential movement; means for axially shifting said shaft in the opposed direction for disposing the gate to position apples above the offset cups of successive rows in said trays once after each movement to its apple releasing position; means for advancing said successive rows of apples to said apple releasing gate; and means for operating said row advancing means, said gate releasing movement, and apple positioning means sequentially in timed relation to each other.

6. In a machine for putting apples in trays having apple receiving cups disposed in rows with cups of successive rows offset from each other, the combination of means for advancing jumbled apples into the machine; means for arranging the apples in successive rows; an apple releasing gate movable alternately between an apple retaining position and an apple releasing position; means for advancing said successive rows of apples to said apple releasing gate; means for disposing each said tray and said gate relative to each other to deposit the rows of apples released from said gate into said successively offset tray cups; means for operating said row advancing means and said gate and relative positioning means sequentially in timed relation to each other; and separate relatively faster conveyor means for rapidly advancing filled trays of apples from said machine.

7. In a machine for putting apples in trays having apple receiving cups disposed in rows with the cups of successive rows offset from each other; the combination of means for advancing jumbled apples into the machine; means for arranging the apples in successive rows; and apple releasing gate having apple spacing members adapted to dispose each apple in each row spaced from the other apples in the same row; means for advancing said successive rows of apples to said apple releasing gate; said gate being movable between an apple retaining position and an apple releasing position; means for disposing said tray and said gate relative to each other to deposit the rows of apples released from said gate into said successively offset tray cups and including means for sequentially shifting said gate longitudinally of said tray rows, whereby to dispose the apples held by said apple spacing members over said cups; and means for operating said row advancing means and said gate and relative positioning means sequentially in timed relation to each other.

8. In a machine for putting apples in trays having apple receiving cups disposed in rows with the cups of successive rows offset from each other, the combination of means for advancing jumbled apples into the machine; means for arranging the apples in successive rows; an apple releasing gate movable alternately between an apple retaining position and an apple releasing position; means for advancing said successive rows of apples to said apple releasing gate; means for relatively disposing said trays and said gate to receive the rows of apples released from said gate and said tray cups; conveyor means disposed to receive said trays advancing from said gate; means for operating said row advancing means, said gate, and relative positioning means in timed relation to each other; and means for operating said conveyor during the time interval lapse between the operation of said gate wherein the last row of apples is released into one tray, and the operation of said gate wherein the first row of apples is released into the next succeeding tray, and stopping said conveyor at other times.

References Cited in the file of this patent

UNITED STATES PATENTS

| | | |
|---|---|---|
| 1,090,855 | Jagenberg | Mar. 24, 1914 |
| 2,236,945 | Gibbs | Apr. 1, 1941 |
| 2,280,854 | Rooney | Apr. 28, 1942 |
| 2,400,484 | Campana | May 21, 1946 |
| 2,684,799 | Holstein | July 27, 1954 |
| 2,776,037 | Baigent | Jan. 1, 1957 |